No. 863,612. PATENTED AUG. 20, 1907.
L. KRIEGER.
GEARING.
APPLICATION FILED DEC. 2, 1905.
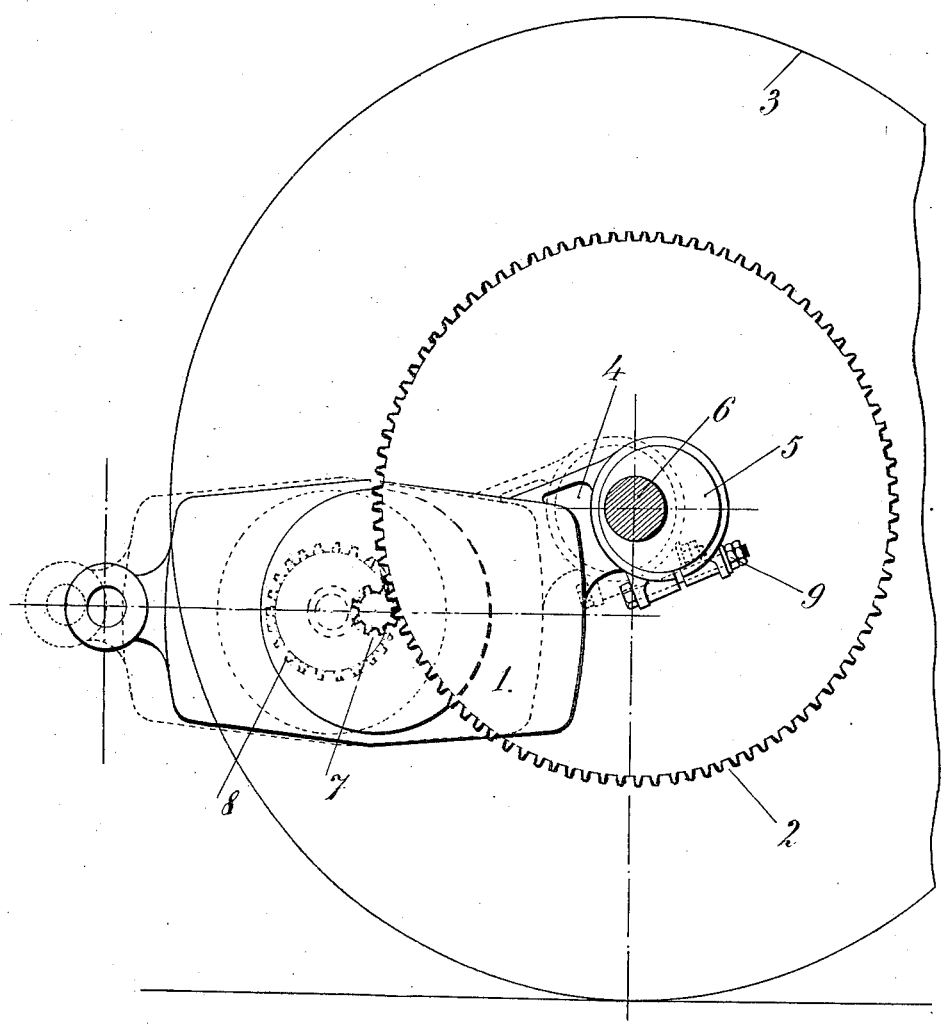
Witnesses:
E. O. Hildebrand
N. Reynolds
Inventor:
Louis Krieger,
by Georgii & Massie
Attorneys

UNITED STATES PATENT OFFICE.

LOUIS KRIEGER, OF PARIS, FRANCE.

GEARING.

No. 863,612.  
Specification of Letters Patent.  
Patented Aug. 20, 1907.

Application filed December 2, 1905. Serial No. 290,013.

*To all whom it may concern:*

Be it known that I, LOUIS KRIEGER, of Paris, France, have invented a new and useful Improvement in Gearing, which improvement is fully set forth in the following specification.

This invention has for its object a method of changing the gear of a self propelled vehicle driven by an electric motor.

It consists in fixing one of the supports to which the motor is attached up on an eccentric sleeve in which the axle rotates in such a manner as to permit of altering the distance of the drive axle from the axis of the driving pinion in order to allow of the employment of pinions of different diameters.

The annexed drawing illustrates one method of carrying out this invention.

The motor 1, which drives the toothed wheel 2, is fixed to the road wheel 3 and is carried by two supports, one of which 4 encircles a sleeve 5 which is mounted eccentrically on the axle 6, upon which it can turn. Upon the angular position of the sleeve 5 in the support 4 depends the distance apart of the centers of the toothed wheel 2 and the shaft of the motor. By altering this angular position the toothed wheel 2 may be driven by pinions of different sizes and thus gearings of any sort suitable to differences in weight of the vehicle or in the nature of the road.

The drawing illustrates in full and dotted lines the positions of the motor corresponding to the employment alternatively of two pinions 7 and 8.

The sleeve 5 is maintained in the required position in the frame 4 by any suitable mechanical arrangement, for example by means of a bolt 9 which may act both by tightening the frame and as a key bearing against suitable surfaces formed upon the sleeve 5. By removing the bolt the eccentric sleeve may be turned to the angle corresponding to the gearing desired.

Having now particularly described and ascertained the nature of my invention and in what manner the same is to be performed, I declare that what I claim is:

1. The combination of a drive-wheel, motor driven gears of diverse diameter arranged to gear alternatively with the drive-wheel, and a gear support mounted eccentrically of the drive-wheel with a range of displacement corresponding to the difference in size of the gears.

2. The combination of a drive-wheel, motor driven gears of diverse diameter arranged to gear alternatively with the drive-wheel, a support for the gears having an eccentric bearing upon the axle of the drive-wheel with a range of displacement corresponding to the difference in the size of the gears.

3. The combination of a drive-wheel, motor driven gears of diverse diameter arranged to gear alternatively with the drive-wheel, a support for the gears, an eccentric sleeve upon the axle of the drive-wheel serving as a bearing for the motor support and having a range of displacement corresponding to the extreme difference in size of the gears.

4. In a motor vehicle, the combination of a drive-wheel, an eccentric sleeve mounted on the drive-wheel axle, motor driven gears of diverse diameter arranged to gear alternatively with the drive-wheel, a gear support mounted on the eccentric sleeve, and means for shifting the position of the sleeve relative to the support and axle to bring the gears alternatively into operative relation to the drive-wheel.

In testimony whereof I have signed this specification in the presence of two subscribing witnesses.

LOUIS KRIEGER.

Witnesses:
 FREDERIC W. CAULDWELL,
 GASTON DE MESTRAL.